United States Patent

Ruprechter et al.

[11] Patent Number: 4,538,761
[45] Date of Patent: Sep. 3, 1985

[54] WINDUP-HOSE IRRIGATING APPARATUS

[75] Inventors: Adam Ruprechter, Voitsberg; Herwig Hutter, Köflach, both of Austria

[73] Assignee: Rohren- und Pumpenwerk Rudolf Bauer Gesellschaft m.b.H., Voitsberg, Austria

[21] Appl. No.: 472,099

[22] Filed: Mar. 4, 1983

[30] Foreign Application Priority Data

Mar. 4, 1982 [AT] Austria ................................. 861/82

[51] Int. Cl.³ ............................................. B65H 75/00
[52] U.S. Cl. ................................ 239/196; 137/355.19; 239/197
[58] Field of Search ................. 239/189, 97, 195–199; 137/355.18, 355.19, 355.2, 355.22, 355.27; 242/85, 86, 75.53, 86.2, 86.5 R

[56] References Cited

U.S. PATENT DOCUMENTS

| | | | |
|---|---|---|---|
| 3,451,623 | 6/1969 | Dibrell | 239/97 |
| 3,972,478 | 8/1976 | Groelz | 137/355.16 X |
| 4,174,809 | 11/1979 | Arlemark | 239/197 X |
| 4,186,881 | 2/1980 | Long | 239/198 |
| 4,276,900 | 7/1981 | Rosenquist | 239/197 X |

FOREIGN PATENT DOCUMENTS

| | | |
|---|---|---|
| 364566 | 10/1981 | Austria . |
| 2633855 | 2/1978 | Fed. Rep. of Germany . |
| 2746230 | 4/1978 | Fed. Rep. of Germany . |

*Primary Examiner*—Andres Kashnikow
*Assistant Examiner*—Daniel R. Edelbrock
*Attorney, Agent, or Firm*—Karl F. Ross; Herbert Dubno

[57] ABSTRACT

An irrigating apparatus whose hose drum is propelled by water power to take up the hose. A hose guide is movable back and forth across the drum to deposit the hose in layers thereon and the hose guide is coupled to a threaded spindle on which a nut rides. A link connects this nut to a valve which throttles the flow to the water-power motor for the drum to progressively decrease the angular velocity of the drum as the hose is taken up.

5 Claims, 3 Drawing Figures

WINDUP-HOSE IRRIGATING APPARATUS

FIELD OF THE INVENTION

The present invention relates to a windup-hose irrigating apparatus and, more particularly, to an apparatus of the type in which a hose reel or drum is powered by irrigation water and is driven to draw in the hose and irrigating head after the hose has initially been drawn out to position this head in a field or plot to be irrigated.

BACKGROUND OF THE INVENTION

Irrigating apparatus of this type generally comprises a traveling sprahyead of nozzle assembly from which the water is dispersed over a wide path, a hose connected to this assembly and adapted to be wound upon a hose reel or drum, usually in a plurality of layers, and a water-powered drive mechanism connected to the drum or reel for winding up the hose on the drum and thereby drawing the nozzle assembly along a linear path between its original location and the drum while water continues to be dispensed from the nozzle assembly over a swath which can be both of considerable width and of considerable length.

The drive means associated with the drum can be provided with a piston motor controlled by a slide or valve which alternately shifts the water pressure to opposite sides of the piston of this motor. The water line connected to this valve and to the motor can be provided with a throttle which is controlled to establish the hose takeup torque and therefore the hose takeup speed at least initially.

Irrigating units of this type have been found to be highly advantageous because of their low cost and comparatively compact construction. They are generally placed by a tractor which can tow the reels or drums along to pay out the hose or which can tow the nozzle heads away from the hose drum.

For uniform irrigation it is important that the velocity with which the nozzle head moves along its path from its starting position of the drum be as uniform as possible. There are many influences upon the windup speed or recoiling speed of the drum which must be taken into consideration. For example, as the hose is drawn in, the frictional retardation between the hose and the ground diminishes and for a given force applied to the drum, the windup velocity tends to increase.

As the layers of the hose build up on the drum, moreover, the peripheral speed of the outermost layer increases as a result of the greater distance from the drum axis. Thus, for a given angular velocity of the drum, the windup speed increases in steps as layer after layer of hose has built up on the drum.

With conventional hose takeup irrigators, therefore, the movement of the nozzle head tends to be nonuniform, ie. progressively increases as the head moves closer to the drum as layer after layer of hose builds up on the drum. Since the amount of water discharged per unit time from the nozzle tends to be more or less constant in such systems, the successive portions of the path of the nozzle, because of the increased velocity at which the hose is wound up, receive less water than the starting portions of the path and there is, in general a nonuniform distribution of water.

French Pat. No. 2,179,596 describes an irrigating apparatus which provides a transverse bar responding to the build up of layers of hose on the drum and which becomes more and more inclined with the increasing effective diameter of the drum or the hose coil and acts upon a slide to reduce the quantity of water fed to the working cylinder and thereby diminish the angular velocity of the drum as layers tend to build up on the latter. With each jump in effective diameter, corresponding to an increased layer, there is a sudden drop in the velocity of the drum. The movement of the irrigating head thus tends to be discontinuous and the entire apparatus is subjected to sudden influences which reduce its effectiveness.

OBJECTS OF THE INVENTION

It is the principal object of the present invention to provide an improved irrigating apparatus which is capable of a more uniform irrigation of a swath of field than has hitherto been the case and which utilizes simple means for controlling the speed of the drum to maintain the displacement of the nozzle head substantially constant.

Another object of this invention is to provide an irrigating apparatus of the class described which obviates the disadvantage of earlier systems and eliminates the need for a transverse bar or the like for sensing the coiling of the hose on the drum.

Still another object of the invention is to provide a comparatively simple, reliable and efficient mechanism for modifying the speed of a drum in an apparatus of the type described, to maintain a uniform coil velocity for the hose and a substantially uniform distribution of water from the nozzle head along its retraction path.

SUMMARY OF THE INVENTION

These objects and others which will become apparent hereinafter are attained, in accordance with the invention, in an apparatus of a class described which comprises a hose reel, a flexible hose which can be wound up by this reel, a waterpowered drive for the hose reel and a nozzle assembly at the end of this hose for spraying water from the device as the hose is reeled in, the improvement according to the invention providing a cam which is connected to a throttle for the water fed to the drive and which, moreover, is connected to the drive so as to be substantially continuously driven as the hose is reeled in to throttle the flow of water to the drive and thereby decrease the angular velocity of the reel or drum to compensate substantially for increases in the effective diameter of the hose and winding portion thereof and the decrease in friction as the hose is taken up.

More specifically, the invention provides a cam having an eccentric surface surrounding an axis about which the cam is rotatable by coupling means connecting the cam with the drum for synchronous rotation therewith. A cam follower is responsive to the contour of this cam and operatively connected by appropriate link means with a throttle valve in the water line running to the waterpowered drive.

According to a feature of the invention the waterpowered drive can be a piston motor, the piston of which is coupled with a pawl for stepping the drum and which, in turn, is controlled by a slide valve fed with the water through the aforementioned throttle valve.

Preferably, the contour of this cam can have its minimum distance from the axis of rotation thereof adapted to correspond to the minimum throttling of the valve while the cam portion most distant from the axis corresponds to the greatest throttling of the valve.

Naturally, a reverse organization of the cam and link means can be provided. i.e. the minimum distance of the cam contour from its axis can correspond to the greatest degree of throttling while the maximum distance from the axis corresponds to minimum throttle.

With appropriate configuration of the cam, it is possible not only to compensate for the decrease and frictional retardation of the hose against the ground, but also to so decrease the angular velocity of the drum that, each time the hose jumps to the next layer, on take-up, the actual peripheral speed and hence the linear speed of take up of the hose increases only to its original linear velocity (or slightly thereabove) so that all layers have a substantially constant mean linear velocity shown.

According to another feature of the invention, the cam can by synchronized with the drum by a coupling means which can include a sprocket wheel forming part of the drive for the hose-depositing member which reciprocates as the drum rotates to lay the hose in uniform layers on the drum. This coupling means can include a spindle, connected to the sprocket, a nut driven by this spindle, a rod pivotally connected to the nut and a lever pivotally connected to the rod and rotatable about the axis of rotation of the cam which can be releasably connected to this lever.

This construction ensures that the cam will be rotated synchronously with the take-up of the hose and rotation of the drum since the rotation of the sprocket wheel is transformed by the nut and spindle into a translatory movement and the latter movement is converted by the lever into an angular displacement of the cam.

According to another feature of the invention, the cam follower lever is a bellcrank lever pivotally connected or fulcrumed on the frame of the apparatus and having a cam follower roller on one arm of this lever engageable with the periphery of the cam. The other arm of the lever can be pivotally connected by a rod to an actuating lever or arm of the throttle valve.

The cam follower lever and its roller thus senses the movement of the arm and translates this movement into a throttling action at the throttle valve.

The base or initial setting of the throttle valve can be set as desired by adjusting the initial position of the cam follower and then rotating the cam relative to its actuating lever to position its contour such that further rotation of the cam will operate the cam follower. To adjust the initial position of the cam follower, a threaded spindle can be spring loaded and can act upon the bellcrank lever and, to allow the initial setting of the cam follower to be coordinated with the initial setting of the cam, the cam can be releasably mounted on a shaft connected with its lever and provided with means for locking the arm in its angularly adjusted position to its latter lever.

The decrease in the linear velocity of the hose is so selective that at the end of each winding layer, this velocity is somewhat less than the starting linear velocity so that, when the hose jumps on to the next layer, its velocity increases to a level which is only slightly greater than the desired linear velocity over the entire path of the irrigating head.

The throttle valve can be any conventional slide, gate or rotary valve or cock and where the valve has a progressive closing characteristic requiring, for example, a greater angular displacement at the beginning of its closing operation than at its end for equivalent throttling, this characteristic can be taken into consideration in the design of the cam contour.

BRIEF DESCRIPTION OF THE DRAWING

The above and other objects features and advantages of the present invention will become more readily apparent from the following description, reference being made to the accompanying drawing in which.

SPECIFIC DESCRIPTION

Figure 1:
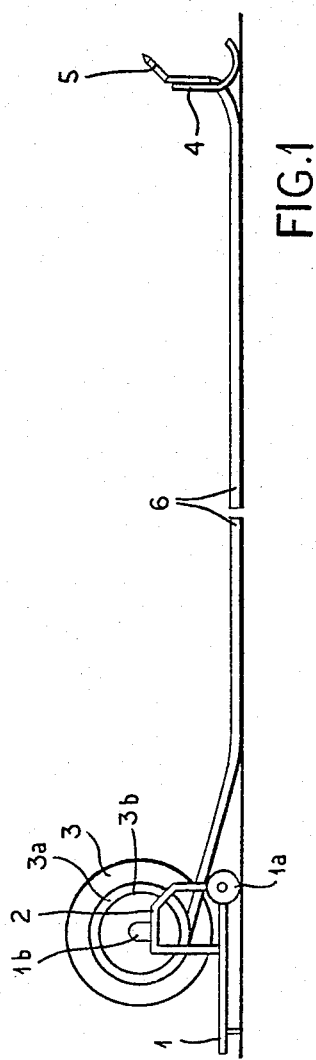
FIG. 1 is a side-elevational view, diagrammatically illustrating the application of the irrigation apparatus of the invention.

In FIG. 1 there is shown an irrigating apparatus which comprises a frame for support 1 which is provided with wheels 1a enabling the frame to be transported along the ground and carrying a framework 2 upon which a reel or drum 3 is mounted for rotation about a horizontal axis 1b to wind up a hose 6 on a hose receiving portion 3a. The first layer of hose has been shown at 3b. The irrigating hose 6 is provided at its opposite end with a skid 4 forming part of an irrigating head and provided with a nozzle assembly 5 which can rotate about its vertical axis to spray water over a considerable distance during such rotation.

The means for delivering water to the hose from a hydrant located at the field is not shown.

The apparatus of FIG. 1 generally operates in the usual way. In the field to be irrigated, the drum is drawn away from the head 5 or the head is drawn away from the drum 3 to pay out the hose, the water source is connected and the waterpower drum progressively reels in the hose, thereby drawing the nozzle 5 toward the drum as spraying proceeds so that the crop is irrigated along a swath defined by the linear path of the hose.

Figure 2:
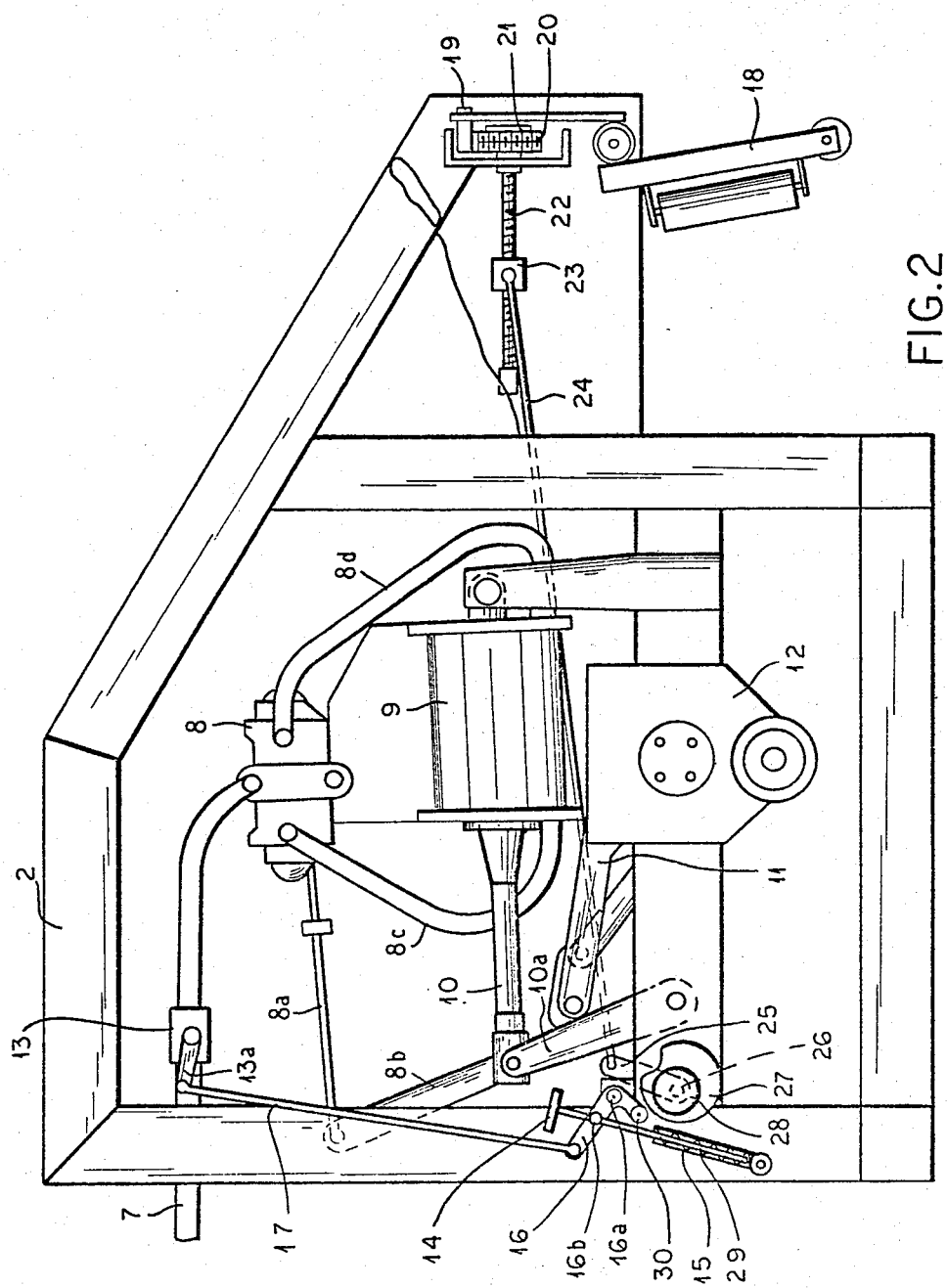
FIG. 2 is a side-elevational view partly broken away, of a portion of the mechanism of this apparatus in so far as it pertains to the irrigation.

The drive means for the drum 3 has only been shown in part in FIG. 2 and comprises a water-powered drive. More specifically, a line 7 feeds water past a throttle valve 13 to a slide valve 8 which is coupled by a rod 8a and a lever 8b to piston rod 10 of a waterpowered cylinder to which the slide valve 8 supplies water under pressure to opposite sides of the piston by the hoses 8c and 8d thereby reciprocating the piston and simultaneously angularly oscillating a lever 10a connected to the piston rod 10. A pawl 11 is connected to the lever 10a and steps a ratchet wheel which is connected to a drum by a drive represented at 12 and not further illustrated. This drive is also operatively connected to a chain 20, one sprocket wheel of which is shown at 21 to drive a hose-laying member 18, 19 which reciprocates across the front of the drum to ensure that the hose will be deposited uniformly in each layer.

The drive is controlled by the throttle valve 13 so that its torque and hence its angular velocity increases as throttling is reduced and vice versa.

An adjusting screw 14, which is rotatable in a tubular housing 15, pivotally connected to the frame 2, serves to set the initial position of the valve 13 by adjusting the angular position of a cam follower lever 16 which is fulcrumed at 16a to the frame and has a nut 16b pivotally connected to the lever and threadedly engaged by the screw 14.

The lever 16 is connected pivotally to a rod 17 which also is connected pivotally to the actuating arm 13a of the throttle valve 13. The long arm of the cam follower lever 16, the rod 17 and the arm 13a, therefore, constitute link means between the cam follower and the throttle valve.

As the drum 3 takes up the hose, the friction forces resisting linear displacement of the hose decrease and hence, in the absence of the mechanism of the present invention and for a given setting of the throttle valve 13, the linear velocity of the hose would tend to increase, resulting in nonuniform watering along the swath. This phenomenon is represented by broken lines in FIG. 3 and can be seen to be exacerbated by the jumps as the hose begins a new layer with a greater distance from the axis of the drum and hence a greater peripheral speed.

It is this disadvantage which is overcome by the present invention.

Since the chain 20 is driven synchronously with the drum to carry the pin 19 affixed to this chain back and forth across the drum and thereby move the hose guide 18 linearly in similar manner, the idler sprocket 21 about which this chain passes is similarly rotated synchronously. In a conventional irrigating apparatus the sprocket 21 serves only as a guide to the chain.

In the system of the invention, however, the sprocket 21 is utilized to rotate a threaded spindle 22 upon which a nut 23 is linearly displaceable.

The rod 24 is pivotally connected to this nut and to a lever 25 which is swingable about an axis 26 corresponding to the axis of a cam 27 which can be released from the lever 25 by the loosening of a nut 28 and can be locked to the lever 25 upon the tightening of the nut.

A spring 29 within the tubular housing 15 applies a force tending to urge a cam follower roller 30 of the cam follower lever 16 against the outer contour of the cam 27. During continuous rotation of the cam and take-up of the hose, the progressively increasing radius of the contour swings the cam follower lever 16 to close the throttle 13 at a rate and with a characteristic determined by the form or configuration of the cam.

For the initial setting of the linear velocity, the screw 14 is used to position the cam follower 30, whereupon the nut 28 is released and the cam 27 is rotated relative to the lever 25 until its contour touches the roller 30. The nut 28 is tightened and the apparatus set into operation, the valve 13 being further throttled as the hose is being taken up in the manner described. The apparatus is reset by drawing the hose off the drum and thereby rotating the spindle 22 in the opposite sense.

Naturally the cam can also be driven synchronously with the drum by other means in the hose guide device, e.g. by coupling the cam directly to the drive for the drum.

Figure 3:
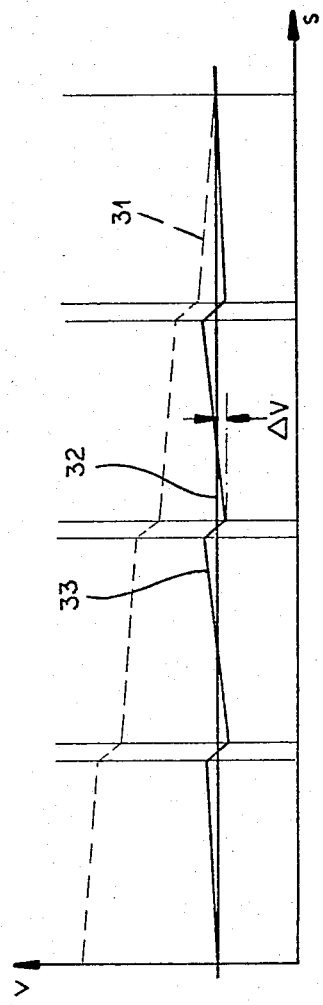
FIG. 3 is a diagram in which the velocity of the irrigating head is plotted against the ordinate against distance along the abscissa showing the results with the claimed invention and with prior art systems.

The operation of the device according to the invention is shown in solid lines in FIG. 3 from which it will be apparent that the velocity is caused to drop by an increment ΔV from its initial velocity over the duration of the depositing of a layer so that its velocity at the start of a layer will only jump by a fraction of the jumps hitherto encountered over the initial velocity. The main velocity for each layer is thus equal to the starting velocity and a substantially constant velocity is achieved over the entire length of the hose. The actual characteristic is shown at 33 for the apparatus of the present invention, at 31 for an apparatus without the velocity-reducing mechanism of the invention and the mean velocity is represented at 32.

What is claimed is:

1. An irrigating apparatus comprising:
   a support;
   a hose drum on said support;
   a hose adapted to be wound up on said hose drum by the rotation thereof relative to said support;
   nozzle means on said hose for dispensing water over an irrigating path as said hose is wound up on said drum;
   a water-powered drive on said support operatively connected to said drum for rotating same;
   a throttle valve operatively connected to said drive for throttling water flow thereto and controlling the angular velocity of said drum;
   a cam rotatable on said support;
   connecting means operatively coupling the rotation of said drum with said cam for rotating said cam synchronously with said drum;
   a cam follower responsive to a contour of said cam; and
   link means operatively connecting said throttle valve with said cam follower for throttling the water supply to said drive in response to rotation of said cam whereby the angular velocity of said drum is reduced as the hose is taken up by said drum, said connecting means including:
   a sprocket wheel rotatably synchronized with said drum,
   means operatively connecting said sprocket wheel with said cam, said sprocket wheel forming part of a hose guide assembly depositing the hose uniformly in layers on said drum,
   a threaded spindle operatively connected to said sprocket wheel,
   a nut on said threaded spindle, and
   means connecting said nut to said cam.

2. The apparatus defined in claim 1 wherein said means connecting said nut to said cam includes a lever pivotally mounted on said support and means for selectively locking said cam to said lever and releasing said cam therefrom.

3. The apparatus defined in claim 2, further comprising a rod pivotally connected to said nut and pivotally connected to said lever for operatively connecting said lever to said rod.

4. The apparatus defined in claim 3 wherein said cam follower includes a cam follower lever pivotally mounted on said support and of the bellcrank type having one arm provided with a cam follower roller engaging said contour of said cam and another arm pivotally connected by a rod to said throttle valve.

5. An irrigating apparatus comprising:
   a support;
   a hose drum on said support;
   a hose adapted to be wound up on said hose drum by the rotation thereof relative to said support;
   nozzle means on said hose for dispensing water over an irrigating path as said hose is wound up on said drum;
   a water-powered drive on said support operatively connected to said drum for rotating same;
   a throttle valve operatively connected to said drive for throttling water flow thereto and controlling the angular velocity of said drum;
   a cam follower responsive to a contour of said cam;
   link means operatively connecting said throttle valve with said cam follower for throttling the water supply to said drive in response to rotation of said cam whereby the angular velocity of said drum is reduced as the hose is taken up by said drum, said cam being rotatable about a cam axis and said contour of said cam having a progressively increasing distance from said axis corresponding to progressive throttling of water supplied to said drive with rotation of said cam corresponding to take-up of said hose; and a setting means operatively connected to said cam follower for setting an initial position thereof corresponding to an initial flow through said throttle valve prior to the displacement of said cam follower by said cam, said setting means including a spring loaded screw threadedly engaged with said cam follower lever and guided in a tubular housing pivotally connected to said support.

* * * * *